United States Patent Office 3,547,686
Patented Dec. 15, 1970

3,547,686
CHELATING POLYMERS AND METHOD
OF PREPARATION
Gaetano F. D'Alelio, South Bend, Ind., assignor of twenty-five percent to Walter J. Monacelli, Cleveland, Ohio
No Drawing. Continuation of application Ser. No. 632,467, Jan. 3, 1967, which is a division of application Ser. No. 367,546, May 14, 1964, now Patent No. 3,395,134, which in turn is a continuation-in-part of applications Ser. No. 28,560 and Ser. No. 28,563, May 12, 1960. This application Aug. 12, 1968, Ser. No. 757,198
Int. Cl. B44d 1/42
U.S. Cl. 117—128.4                                      8 Claims

ABSTRACT OF THE DISCLOSURE

This invention comprises a metal wire having a continuous coating thereon of a chelating polymeric structure having at least 0.1% of a repeating unit of a formula selected from the class consisting of

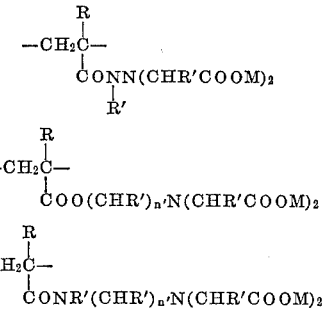

and

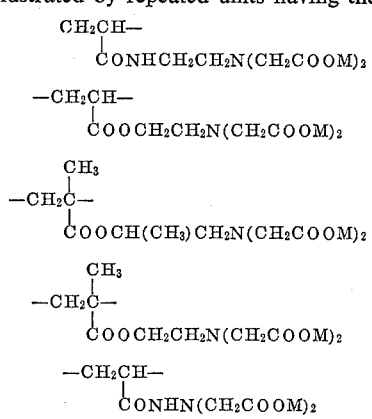

wherein R, R', and $n'$ and M are as defined hereinafter but are illustrated by repeated units having the formulas $$-CH_2CH-$$
$$\qquad\overset{|}{C}ONHCH_2CH_2N(CH_2COOM)_2$$

$$-CH_2CH-$$
$$\qquad\overset{|}{C}OOCH_2CH_2N(CH_2COOM)_2$$

$$\overset{CH_3}{\underset{|}{-CH_2C-}}$$
$$\qquad\overset{|}{C}OOCH(CH_3)CH_2N(CH_2COOM)_2$$

$$\overset{CH_3}{\underset{|}{-CH_2C-}}$$
$$\qquad\overset{|}{C}OOCH_2CH_2N(CH_2COOM)_2$$

$$-CH_2CH-$$
$$\qquad\overset{|}{C}ONHN(CH_2COOM)_2$$

wherein M can be hydrogen, alkyl, aryl, ammonium and metal as more specifically defined hereinafter.

This invention relates to the production of new chelating polymers and a new process for preparing chelating polymers. Generally, it is concerned with crosslinked polymers having pendant coordination groups attached to the chain and to the process of preparing such polymers. It also deals with the grafting of monomers containing coordination groups to preformed polymers.

One object of this invention is to provide an improved and economical method of preparing chelating polymers.

Another object of this invention is to prepare chelating polymers with good physical properties.

A further object of this invention is to prepare such chelating resins from many well-known and available commercial non-chelating polymers.

A still further object of this invention is to tailor-make new chelating resins.

Further objects and advantages of this invention will become apparent as the description of the invention proceeds.

The objects of this invention have been achieved by grafting specific monomers having at least one unsaturated polymerizable ethylenic group and at least one coordination moiety to a preformed polymer. Such monomers may be termed coordination monomers or monomeric ligands. By a monomeric ligand is meant a monomer having (1) at least one vinyl or vinylidene group, and (2) at least one other group containing two atoms such as nitrogen or oxygen which can act as donors to a metal ion. If these donor atoms are specially located in the moiety so that on reaction with the metal ions a five or six membered ring can be formed, such monomers are known as chelating monomeric ligands. Suitable chelating monomers which can form chelating structures are the amino-acetic derivatives. A typical example is β-acryloxy-N-ethyl amino diacetic acid $$CH_2=CHCOOCH_2CH_2N(CH_2COOH)_2$$

which when polymerized alone produces a chelating polymer, also termed a polymeric ligand. When copolymerized with a crosslinking monomer, an infusible polymeric ligand is obtained. The full efficiency of such polymers, though high, is not fully realized because of partial entanglement of the chelating moieties in the polymer network. This efficiency can be improved if more of the chelating functions could be exposed. One possible method of reducing the entanglement is to attach the chelating structures to a preformed polymer, such as by grafting. The fact that a certain monomer is a chelating monomer, is no assurance that when grafted to preformed polymer, that the grafted polymer will act as a chelating polymer. It has already been pointed out (H. P. Gregor, M. Taifer and E. I. Backer, Industrial & Engineering Chemistry), 44 2834 (1952) in the process of preparing a chelating polymer that the chelating function should not be altered by the polymerization reaction and that both arms of the chelate structure should be in the proper spacial arrangement. A convenient process for grafting a monomer to a polymer is by means of ionizing radiation.

One method (A) of grafting a monomer to polymers is to mix or impregnate a polymer M with the monomer, B, and then irradiate the mixture. In this process, the monomer, B, may form some homopolymer which may introduce problems due to solubility and swelling of the homopolymer, but this can be eliminated by using with the coordination monomer, B', a small amount of a crosslinking monomer such as divinylbenzene and others to an amount of 0.1% to 20% based on the coordination monomer, to give lower swelling potentials, greater toughness of the polymer, etc. Besides divinylbenzene, many other crosslinking agents can be used, a few illustrative examples of which are liquid and low molecular weight polybutadiene, divinylnaphthalene, vinyl isopropenyl benzene, diallyl benzene, etc.; the polyunsaturated esters such as ethylene glycol diacrylate, ethylene glycol dimethacrylate, trimethylene glycol dimethacrylate, diallyl-itaconate, glycol maleate, etc.; diallyl succinate, divinylphthalate, diallyl maleate; the polyunsaturated ethers such as divinyl ether, trimethylene glycol divinyl ether, etc. vinyl-phenylacrylate, 2-isopropenyl-5-acryloxy naphthalene; vinyl-3,5-diallyloxy-palmitate, etc.

Another method (B) of grafting a coordination monomer to a preformed polymer comprises irradiating the preformed polymer in the presence of oxygen or air to form polymer hydroperoxides and diperoxides. Such polymeric peroxides are relatively stable at ordinary temperatures but decompose at high temperatures to form macroradicals. If the decomposition is performed in the presence of a monomer, then crosslinked graft copolymers are obtained. For example, when a polymer obtained from monomer M is irradiated in the presence of oxygen, there is obtained a peroxized polymer which contains also crosslinkages and frozen free radicals. Then a monomer, B, is grafted to the polymer, and there is obtained a grafted polymer. Usually, the type of monomer used in normal grafting is a simple monomer such as styrene, methyl acrylate, methyl methacrylate, etc. which do not have to perform, after grafting, complicated functions such as chelation. When a chelating monomer such as

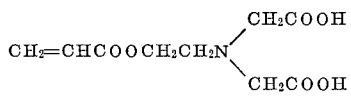

is used in a grafting process, there can be no assurance that the resulting grafted product will be a chelating polymer since changes can be rendered by the process in the structure as pointed out by Gregor et al.

Thus, if the polymer M is polyethylene and the monomer, B, is acryloxy-ethyl iminoacetic acid and this monomer is impregnated into the polyethylene, there is no assurance that on irradiation an efficient chelating polymer will be obtained. The object of this invention accordingly is to prepare chelating polymers by grafting by methods which involve the use of radiation.

Thus, when the polymer M is polyethylene, and the monomer, B', is acryloxy-ethyliminoacetic acid, there is obtained an infusible, graft chelating copolymer having pendant chelating groups to the polyethylene chain, thus

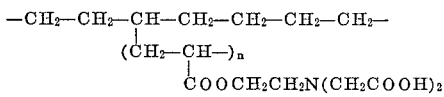

The term "irradiation" as used herein, means high energy radiation and/or the secondary energies resulting from conversion of this electron energy to neutron or gamma radiation, said electron energies being at least 100,000 electron volts. While various types of irradiation are suitable for this purpose, such as X-ray and gamma and beta rays, the radiation produced by high power electron linear accelerations has been found to be very conveniently and economically applicable and to give very satisfactory results. However, regardless of the type of irradiation and the type of equipment used for its generation or application, the use thereof in the production of polymer materials as described herein as contemplated as falling within the scope of this invention, preferably that produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of the polymer or polymerizable materials, and the shorter is the time of exposure required to accomplish the desired result. For other types of irradiation, such as gamma and X-rays, energy systems equivalent to the above ranges of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation," as well as radiations of the type termed "ionizing electromagnetic radiation."

The term, "ionizing particle radiation," has been used to designate the emission of electrons or highly accelerated nuclear particles such as protons, neutrons, alpha-particles, deutrons, beta-particles, or their analogs, di-
rected in such a way that the particle is projected into the mass to be irradiated. Charged particles can be accelerated by the aid of voltage gradients by such devices as accelerators with resonance chambers, Van de Graaff generators, betatrons, synchrotrons, cyclotrons, etc. Neutron radiation can be produced by bombarding a selected light metal, such as beryllium, with positive particles of high energy. Particle radiation also can be obtained by the use of an atomic pile, radioactive isotopes, or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-rays, an ionizing electromagnetic radiation suitable for the practice of this invention, can be obtained by means of a nuclear reactor (pile) or by use of natural or synthetic radioactive material, for example, cobalt 60.

Various types of high power electron linear accelerators are commercially available, for example, from Applied Radiation Corporation, Walnut Creek, California. In the following Example I, the Arco type travelling wave accelerator, Model Mark I, operating at 3 to 10 million electron volts, was used to supply the irradiation. Other types of accelerators, such as supplied by High Voltage Engineering Corporation, Burlington, Massachusetts, or as described in U.S. Pat. 2,763,609 and British Pat. 762,953 are satisfactory for the practice of this invention.

Often times, the radiation doses are reported in megareps, which represent 1,000,000 reps. A "rep" is defined, according to "Reactor Shielding Design Manual," edited by Theodore Rockwell III and published by D. Van Norstrand Company, Inc., 1st edition, 1956, as that radiation dose that produces energy absorption in human tissue equal to 93 ergs per gram of tissue.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (ev.) or million electron volts (mev.). In the irradiation process of this invention, radiation consisting of particles or photons having an energy of 50 ev. and over may be employed and particles or photons having an energy of 0.001 mev. and over are preferred. With radiation of this type, attachment of an unsaturated ligand or chelate to an organic polymer can be obtained with a minimum length of exposure to the radiation permitting maximum efficiency in utilization of the radiation. Particles or photons with an energy equivalent over 0.1 mev. up to 2 to 5 mev. are the most useful from a practical standpoint, although radiation with energies of 10 mev. and higher may be employed. When grafting is accomplished by radiation organic polymer chosen as the substrate for the graft polymer is exposed to at least 0.01 watt-sec./cm.$^2$ of ionizing radiation whether the grafting is done by method A or B given above. When the polymer is peroxidized by irradiation prior to grafting with monomer, the irradiation of the polymer is performed in the presence of small amounts of oxygen such as about $1 \times 10^{12}$ molecules of oxygen per cm.$^2$ of polymer substrate up to the concentration found in normal air or modified by the addition of oxygen, or even pure oxygen. Also, mixtures of oxygen and inert gases such as helium and argon can be used.

The coordination monomers used in the practice of this invention are the new monomers selected from the class having the general formulas

and $$CH_2=\overset{R}{\underset{|}{C}}-CO-Y(CHR')_{n'}N(CHR'COOM)_2$$

wherein:

R represents H, CH$_3$, Cl and CN;
R' represents H or a lower alkyl or aralkyl group;
Y represents O and NR';
n' represents a numerical value of at least 2 and no more than 10.

M is a member of the group consisting of hydrogen, ammonium bases, lower alkyl and lower aryl groups, and metals. The ammonium bases are the ammonium radical and derivatives thereof in which the substituent groups are alkyl and aryl groups preferably of no more than 10 carbon atoms.

Illustrative examples of such monomers are:

$$CH_2CHCONHN(CH_2COOM)_2$$

$$CH_2=\overset{CH_3}{\underset{|}{C}}-CONHN(CH_2COOM)_2$$

$$CH_2=CHCON(CH_3)N(CH_2COOM)_2$$

$$CH_2=CHCOOCH_2CH_2N(CH_2COOM)_2$$

$$CH_2=\overset{CH_3}{\underset{|}{C}}-COOCH_2CH_2N(CH_2COOM)_2$$

$$CH_2=\overset{Cl}{\underset{|}{C}}-COOCH_2CH_2CH_2N(CH_2COOM)_2$$

$$CH_2=\overset{CN}{\underset{|}{C}}-COO\overset{CH_3}{\underset{|}{C}}HCH_2N(CH_2COOM)_2$$

$$CH_2=CHCOO(CH_2)_6N(CH_2COOM)_2$$
$$CH_2=C(CH_3)COO(CH_2)_6N(CH_2COOM)_2$$
$$CH_2=C(CH_3)COO(CH_2)_{10}N(CH_2COOM)_2$$
$$CH_2=CHCOOCH_2CH_2N(CHCOOM)_2$$
$$CH_2=C(CH_3)COON(C_{10}H_{21})CH_2CH_2N(CH_2COOM)_2, \text{ etc.}$$

These monomers all contain the chelating function —N(CHR'COOH)$_2$ and may be considered derivatives of the amino acids H—N(CHR'COOH)$_2$ from which they can be prepared; or they can be considered as acryloxy substituted compounds of derivatives of the imino acids such as the hydrazino diacetic acids,

H—NN(CHR'COOH)$_2$ and the omega-hydroxy alkyl imino diacetic acids,

HO(CHR)$_n$N(CH$_2$COOH)$_2$ and the omega-aminoalkyl imino diacetic acids,

HN(CHR)$_n$N(CH$_2$COOH)$_2$

As used herein, the term "lower alkyl," is intended to include such groups having no more than about 10 carbon atoms, such as methyl, ethyl, propyl, isopropyl, butyl, secondary butyl, amyl, secondary amyl, hexyl, heptyl, nonyl, decyl, secondary hexyl, secondary nonyl, benzyl, phenethyl, dimethylphenethyl, ethylphenethyl, propylphenethyl, butylbenzyl, etc. groups.

The ammonium bases defined herein for M include the ammonium radical and various substituted ammonium radicals having various substituents thereon, such as alkyl groups, aryl groups, hydroxyalkyl groups, etc., preferably those having no more than about 21 carbon atoms, advantageously those having no more than about 10 carbon atoms. Typical examples of such substituted ammonium radicals include those derived from ammonia, methyl amine, dimethyl amine, trimethyl amine, ethyl amine, diethyl amine, triethyl amine, propyl amine, butyl amine, dibutyl amine, tributyl amine, trihexyl amine, triheptyl amine, ethanol amine, diethanol amine, triethanol amine, isopropanol amine, diisopropanol amine, triisopropanol amine, methyl diethanol amine, dimethyl ethanol amine, morpholine, dimethyl benzyl amine, pyridine, ethyl pyridine, quinoline, isoquinoline, amino pyridine, guanidine, biguanidine, aniline, methyl aniline, dimethyl aniline, phenylene diamine, piperazine, triethylene diimine $$(N\underset{CH_2CH_2}{\overset{CH_2CH_2}{\diagup\!\!\!\diagdown}}N)$$

hydrazine, methyl hydrazine, symmetrical dimethyl hydrazine, phenyl hydrazine, amino imidazole, amino diazines, hydrazino triazines, etc.

Typical metals that can be used in substitution for M in the formulas given herein, include lithium, sodium, potassium, rubidium, cesium, calcium, strontium, barium, and the chelate-forming metals as disclosed in "Chemistry of Metal Chelatets" by Martell and Calvin, published by Prentice-Hall (1956). Page 182 of this book shows the periodic classification of chelate-forming metals.

The chelating monomers used in the practice of this invention are readily and economically prepared from commercially available chemical intermediates. They can be prepared by reaction an acrylyl chloride, $$CH_2=\overset{R}{\underset{|}{C}}-COCl$$

in the presence of a hydrohalide acceptor (HAC), with (1) an amino-imino diacetic acid:

$$CH_2=\overset{R}{\underset{|}{C}}COCl+HNR'N(CHR'COOH_2) \xrightarrow{HAC}$$

$$CH_2=\overset{R}{\underset{|}{C}}CON\overset{R'}{\underset{|}{N}}(CHR'COOH)_2$$

or for example $$CH_2=CHCOCl+H_2NN(CH_2COOH)_2 \xrightarrow{Na_2CO_3}$$

$$CH_2=CHCONHN(CH_2COOH)_2$$

or (2) an omega-hydroxy alkyl imino diacetic acid:

$$CH_2=\overset{R}{\underset{|}{C}}COCl+HO(CHR')_nN(CHR'COOH)_2 \xrightarrow{HAC}$$

$$CH_2=\overset{R}{\underset{|}{C}}COO(CHR')_nN(CHR'COOH)_2$$

for example $$CH_2=C(CH_3)COCl+HOCH_2CH_2N(CH_2COOH)_2 \xrightarrow{Na_2CO_3}$$

$$CH_2=C(CH_3)COO(CH_2)_2N(CH_2COOH)_2$$

or (3) with an omega-aminoalkyl iminodiacetic acid:

$$CH_2=\overset{R}{\underset{|}{C}}COCl+NHR'CHR'N(CHR'COOH)_2 \xrightarrow{HAC}$$

$$CH_2=\overset{R}{\underset{|}{C}}-CON(CHR')_nN(CHR'COOH)_2$$

for example $$CH_2=\overset{Cl}{\underset{|}{C}}COCl+NH_2(CH_2)_2N(CH_2COOH)_2 \xrightarrow{NaNCO_3}$$

$$CH_2=\overset{Cl}{\underset{|}{C}}CONH(CH_2)_2N(CH_2COOH)_2$$

The hydrazino-acetic acids are readily prepared by reacting the appropriate hydrazien with chloroacetic acid according to the method of Bailey and Read given in J. Am Chem. Soc. 36, 1747 (1914) as illustrated by the equation:

$$N_2H_4 + ClCH_2COOH + 2K_2CO_3 \rightarrow H_2NN(CH_2COOH)_2$$

from which the free acid crystallizes when the pH of the solution is adjusted to 4.

The omega-aminoalkyl iminodiacetic acids are readily prepared from diamines by the method of Moore, Boyle and Thorn given in J. Chem. Soc., p. 39 (1929) whereby one amino group is first reacted with a chlorocarbonate and the second amino group is reacted with a haloacetic ester as illustrated by:

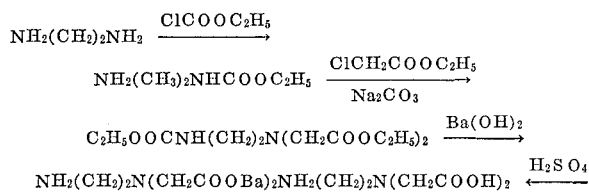

Alternately, the amino-derivative can be more readily prepared by treating an iminodiacetic acid alkali salt with an alkylene imine:

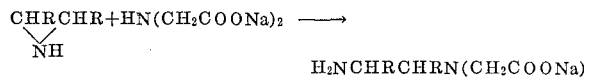

for example

CH$_2$CH$_2$+HN(CH$_2$COONa)$_2$ $\longrightarrow$
\/
NH

H$_2$NCH$_2$CH$_2$N(CH$_2$COONa).

Some omega-hydroxy alkyl imino diacetic acids are commercially available such as $$HOCH_2CH_2N(CH_2COOH)_2$$

and this class of intermediate is readily prepared by reacting the amino alcohols with (1) chloroacetic acid, or (2) with an aldehyde and alkali cyanide followed by saponification: Thus,

e.g.

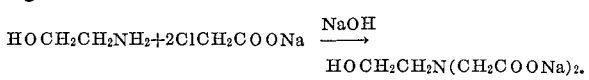

or

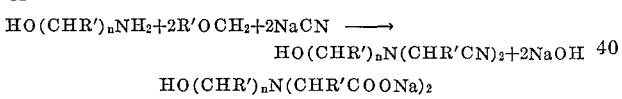

Alternately, these compounds can be more readily prepared by reacting an alkylene oxide with an imino acid:

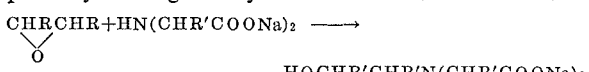

for example

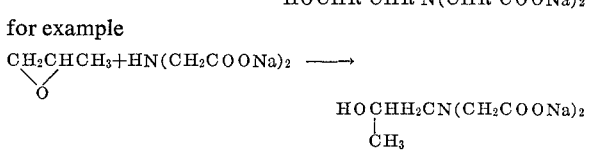

The monomers of this invention can be polymerized individually or as mixtures with each other, or with 0.1, preferably 1 percent by weight or more of other vinyl and vinylidene compounds, such as styrene, alphamethyl styrene, vinyl toluene, vinyl xylene, chlorostyrene, butadiene, isoprene, acrylonitrile, methacrylonitrile, methacrylate, ethylacrylate, benzylacrylate, methyl methacrylate, glycol diacrylate, glycol diacrylate, glycol dimethacrylate, allyl acrylate, allylmethacrylate, vinyl acetate, vinyl propionate, diallyl succinate, diallyl phthalate, maleic anhydride, dimethyl maleate, itaconic anhydride, itaconic imide, dimethyl itaconate, diiallyl itaconate, acrylamide, methacrylamide, allylacrylamide, hydroxyethylacrylamide, N-methylene-bis-acrylamide, acetylglycine, vinyl pyridine, methacrylyllysine, methylvinylketone, acetylaminophenylethylene, vinylimidazole, 2-isopropenyl-4-isopropyl-2-oxazolin-5-one, N-vinyl - 5 - methyl-2-oxazolidinone, N-vinyl pyrrolidone-2, etc., or they can be grafted to other polymers containing peroxy groups to produce grafted copolymers, as disclosed in my copending application, Ser. No. 28,560, filed the same date herewith.

When large quantities of the order of 99.9% of a non-chelating monomer such as styrene, methyl methacrylate, etc. are used, improved adhesion of such polymers to metal substrates is obtained, and this improvement is attributed to chelation of the imino-diacetic acid groups contained in the copolymer with the metal surface.

The polymers and copolymers of this invention can be prepared in mass, in solution, in suspension, and emulsion systems, using the accepted initiating systems, such as the per compounds that generate radicals, or thermally, or with ultraviolet light, or with ionizing radiation, and in some cases, with ionic catalysts, both cationic and anionic, e.g. BF$_3$, sodamide, HF, etc.

In the practice of my invention, I have also discovered in improved and economical method for the grafting of monomers, including coordination monomers, to crosslinked, peroxidized polymers which comprises impregnating the peroxidized polymer with the monomer and thereafter effecting the grafting in a non-reactive liquid media in which the polymer is insoluble. For example, by irradiating polyethylene beads in the presence of oxygen in a tumbling barrel with an electron beam, there is obtained a crosslinked, peroxidized polyethylene. These beads then are immersed in a 50% ether solution of the dimethyl ester of acryloxyethyliminoacetic acid, the swollen beads separated from the solution, the ether evaporated from the beads, the beads dispersed in water, preferably with a small amount of interfactial or dispersion agent, and graft polymerization achieved by heating while the dispersion is agitated. By this process, sticking and agglomeration is avoided and tough, resilient, non-fragile chelating polymers are obtained. In those cases where the monomer is an active swelling agent for the polymer, the use of auxiliary swelling agents is not necessary. In other cases where the boiling point of the swelling agent is higher than about 50° C., as for example, benzene or toluene, it is not necessary to remove it from the swollen polymer before grafting the monomers, and in the case of the low boiling swelling agents, if the grafting of the monomer is accomplished under pressure, it becomes unnecessary to remove the swelling agent unless desired.

The organic polymers suitable for grafting include any normally solid organic polymeric material, particularly those with molecular weights in excess of 500 and especially in excess of 2000. The polymers may be oriented or unoriented. Thus, there may be employed hydrocarbon polymers, such as polyethylene, polystyrene, polybutadiene, rubber polyisobutylene, butadiene-styrene copolymers and the like; halogenated hydrocarbon polymers such as polyvinyl chloride, polyvinylidene chloride, polychloroprene, polytetrafluoroethylene, polyvinyl fluoride and the like; ester-containing polymers such as polyvinyl acetate, polymethyl methacrylate, polyethylene terephthalate and the like; hydroxyl-containing polymers such as polyvinyl alcohol, cellulose, regenerated cellulose and the like; ether-containing polymers such as solid poly-tetrahydrofuran, dioxolane polymers and the like; condensation polymers, such as phenol-formaldehyde polymers, urea-formaldehyde polymers, triazine-formaldehyde polymers, polyamides, polyimides, and the like; polyacrylonitrile, polyvinyl acetals and mixtures or copolymers based on two or more of the above compounds, as well as natural polymers, such as cotton, wool, silk and the like.

The shape of the organic polymer employed as a substrate in the present invention is not limited or critical. It may be a film, molded object, fiber, knitted or woven fabric, tube, pipe, beading, tape, extruded molding, wire covering, powder or the like. Of particular advantage are films, fibers, fabrics, and various extruded forms since they are readily adapted to continuous operation according to the process of this invention. Shaped polymers in these forms may be unrolled or extruded into the path of ionizing radiation and then either run substantially immediately into contact with the polymerizable monomer or wound up and contacted with the polymerizable monomer in a separate treatment.

The chelating polymers prepared by the process of this invention are useful in the recovery of and the separation of metals which form chelates. These are disclosed in "Chemistry of Metal Chelates" by Martell and Calvin, published by Prentice-Hall in 1956. Page 182 of this book has a table showing the periodic classification of chelate forming metals. Those metals for which the process of this invention is particularly appropriate are those of Groups III and IV of the periodic having atomic weights of at least 80, as well as magnesium and the metals of Group VIII. This invention is very useful in recovery of rare earths or lanthanides, and the actinides since they are generally found in very dilute concentrations and generally are otherwise very difficult to recover and separate. Specific metals for which this process is particularly appropriate include aluminum, titanium, vanadium, silicon, chromium, manganese, iron, cobalt, nickel, copper, zinc, magnesium, gallium, germanium, arsenic, ytterbium, zirconium, columbium. technetium, molybdenum, ruthenium, rhodium, palladium, silver, cadmium, indium, tin, antimony, hafnium, tantalum, tungsten, rhenium, osmium, iridium, platinum, gold, mercury, thallium, lead, bismuth, scandium, lathanum, thorium, uranium, plutonium, etc.

While reference is sometimes made herein to recovery of the metal, it is intended to include recovery of the metal in the cationic form or in the form of its compound, or in accordance with whatever manner the metal exists in the chelate form and the state in which it is subsequently removed from the chelated polymer.

The following examples are given to illustrate better various methods for the practice of this invention and are not intended in any way as a limitation on the methods of practicing the invention. Parts and percentages are by weight unless otherwise indicated.

EXAMPLE I

A spool containing 1000 grams of 400 denier polyethylene filament is irradiated by running the filament through a radiated field in air at room temperature to a 15 megarep dose. The filament then is immersed in a 50% mixture of $CH_2=CHCOOCH_2CH_2N(CH_2COOH)_2$ and ethyl acetate and heated to 50° C. until the increase in weight of the filament is about 45%. The filament then is washed in acetone to remove unreacted monomer and the grafted copolymer hydrolyzed at 80° C. in a 10% sodium hydroxide alcoholic solution followed by washing with water to remove free sodium hydroxide. The filamentary chelating polymer is passed through a liter of 3% sodium chloride solution containing 1% of cupric ions as the chloride. As the polymer reacts with the copper ion it becomes blue in color, the copper being exhausted substantially from the solution when less than 50% of the filamentary polymer is passed through the solution. The exposed portion of the filament is washed with water until free of sodium chloride and then immersed in 2 N hydrochloric acid from which water and excess hydrochloric acid are recovered by evaporation, leaving substantially pure cupric chloride as a residue.

By substituting other acids for the hydrochloric acid in the recovery stage, such as nitric, sulfuric, phosphoric, etc., copper nitrate, copper sulfate, copper phosphate, etc., is recovered instead of cupric chloride.

When a correspondingly larger amount of solution containing 0.1% cupric ion instead of 1% is used in this example, a similar recovery of metal is obtained. Substantially all of the metal is recovered also from similar solutions containing a lower concentration of copper ions, for example, in a 3% sodium chloride solution containing 250 parts per million, 100 parts per million, and 5 parts per million, respectively, of copper ion. Recovery of copper also is obtained from solutions containing other alkali and alkali-earth salts such as potassium, lithium, magnesium, calcium, and strontium, such as their chlorides, nitrates, sulfates, phosphates, and acetates. For example, all of the cooper is recovered from a 15% calcium chloride solution having 25 p.p.m. of copper ions.

EXAMPLE II

The procedure of Example I is repeated with cobaltic chloride solutions and the metal is recovered in a similar manner. During the process, the filamentary chelating polymer becomes red as it reacts with the cobalt ions. When solutions of aluminum, cesium, lanthanum, chromium, manganous, manganic, ferrous, ferric, nickel, zinc, cadmium, lead, platinum, palladium, vanadium, tantalum, zirconium, titanium, and uranium ions are used instead of copper or cobalt ions, they are recovered also in a similar fashion.

EXAMPLE III

The procedure of Example I is repeated using a 3% NaCl solution containing 0.1% of cupric ion and 0.1% of cobalt ions. When the filamentary chelating polymer is drawn slowly through the solution, a blue color appears on the filament until almost all of the copper is coordinated, then the color becomes red until substantially all of the cobalt is coordinated. When the process is repeated in the absence of sodium chloride in the solution, an identical separation is obtained.

EXAMPLE IV

The process of Example III is repeated to recover and separate cobalt and nickel from the following solutions

| Solution No. | Salt | Percent | Percent cobalt | Percent nickel |
|---|---|---|---|---|
| 1 | NaCl | 0 | 3.0 | 3.0 |
| 2 | NaCl | 3 | 0.15 | 0.02 |
| 3 | KCl | 2 | 0.01 | 0.04 |
| 4 | CaCl$_2$ | 6 | 0.004 | 0.0015 |
| 5 | LiCl | 1 | 0.001 | 0.001 |
| 6 | Na$_2$SO$_4$ | 1 | 0.001 | 0.001 |

EXAMPLE V

The grafting procedures of Example I is repeated with $CH_2=CHCONHCH_2CH_2N(CH_2COOH)_2$ as the monomer and is used for the recovery of metals according to the procedures of Examples I to IV inclusive.

EXAMPLE VI

The grating procedure of Example I is repeated using as the monomer

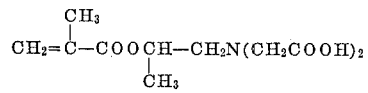

and used for the recovery of metals by the procedures of Examples I to IV inclusive.

EXAMPLE VII 1000 parts of polyethylene granules are irradiated in air in a tumbling barrel at room temperature with a cobalt 60 source to a dose of 15 megareps and then immersed in a 50% mixture of

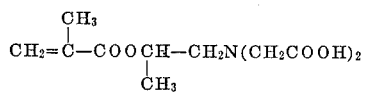

and heptane and heated at 60° C.–70° C. until the increase in weight is about 15% and there is obtained a graft copolymer having chelating properties similar to the polymer of Example I.

EXAMPLE VIII

The procedures of Examples I to VII are repeated with polypropylene and similar results are obtained.

EXAMPLE IX

The procedure of Examples I to VII are repeated with a 90% ethylene-10% propylene copolymer with similar results.

EXAMPLE X

The procedures of Examples I to VII are repeated with a polymer of butene-1 and similar results are obtained.

EXAMPLE XI

The procedures of Examples I to VII are repeated with polyacrylonitrile and coordination polymers are obtained and used with similar results.

EXAMPLE XII

The procedures of Examples I to VII are repeated with unplasticized polyvinyl chloride using 10% by weight of divinylbenzene based on the grafting monomers and similar results are obtained.

EXAMPLE XIII

The procedures of Examples I to VII are repeated with polytetramethylene-terephthalate using 10% by weight of diallylphthalate based on the grafting monomers and coordination polymers are obtained and used in a similar fashion.

EXAMPLE XIV

The procedure of Example VII is repeated with 6-6 nylon containing 5% divinylbenzene with similar results.

EXAMPLE XV

The procedure of Example VII is repeated with polycaprolactam containing 5% diallyl maleate with similar results.

EXAMPLE XVI

The procedure of Example VII is repeated with polytrofluorovinyl chloride-perfluoro propylene copolymer using 10% by weight of divinylbenzene based on the grafting monomer and similar results are obtained.

EXAMPLE XVII

The procedure of Example XIII is repeated using polydimethylsilicone and with similar results.

EXAMPLE XVIII 1000 parts of polyethylene beads $\frac{1}{16}''$ diameter are irradiated in air at room temperature in a tumbling barrel to a 22 megarep dosage and thereafter immersed in a 25% solution of $$CH_2=C(CH_3)COOCH_2CH_2N(CH_2COOH)_2$$

in ethyl acetate until the beads increase in weight about 37% following which they are added to 1500 parts of water containing 30 parts of sodium chloride and 10 parts of sodium dodecylbenzene sulfonate. This dispersion is heated at 65°–70° C. for 36 hours while the mixture is agitated constantly and there is obtained a graft copolymer containing pendant.

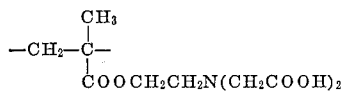

groups. When packed in a column they are shown to be effective chelating polymers for iron, nickel, cobalt, zirconium, and copper.

EXAMPLE XIX

The procedure of Example I is repeated using instead of a copper solution, an 8% NaCl solution containing 0.1% $MgCl_2$ and the $MgCl_2$ is extracted from the solution, with similar results.

EXAMPLE XX

Example I is repeated with a series of coordination polymers prepared by the grafting of 10, 25, 50, 75, 100, 150, 250, and 300% respectively of $$CH_2=CHCOOCH_2CH_2N(CH_2COOH)_2$$

on the respective percentages representing the increase in weight of the polyethylene filament due to the additional amount of material grafted thereon and (a) copper recovered substantially quantitatively from a 3% sodium chloride solution; (b) zinc recovered substantially from a 10% $K_2SO_4$ solution containing 0.5% zinc chloride.

EXAMPLE XXI

The procedures of Example XX is repeated using polyethylene monofilaments of 50, 100, 250, 500, 750, 1020, 1330, 4380, 7600, 13,565 denier with similar results.

EXAMPLE XXII

The procedure of Example XXI is repeated using, instead of monofilaments, a number of twisted polyethylene multifilaments, namely, (a) two 5-thread 500 denier line, (b) a 6-thread 1200 denier line, (c) a 10-thread 4500 denier line, (d) a 15-thread 7500 denier line, and (e) a 20-thread 15,000 denier line, with similar results.

EXAMPLE XXIII

A 7-stand stainless steel wire of 0.15 inch diameter is extrusion-coated with 5 mils of high density polyethylene (0.935) and from the 5 mil reinforced polyethylene a coordination polymer is prepared and used as in the procedure of Example I, and similar results are obtained. Instead of the 7-strand wire, a single wire of corresponding diameter is used to produce a stiffer product, and a larger number of strands is used to produce a more flexible product.

EXAMPLE XXIV

A hollow polyethylene monofilament (4.5 millimeters outside diameter and 2.5 millimeters inside diameter) is treated by the procedure of Example I and there is obtained a hollow linear coordination polymer of greater buoyancy. When this polymer is used in recovering the copper by the procedure of Example I, the cobalt of Example III, and the zinc of Example V, identical results are obtained as when the solid polymers are used. By pinching and heat-sealing the hollow monofilament at regular 36-inch intervals along its length, air is sealed within the tube. If, instead of air, another gas, such as nitrogen, helium, or argon is used during the extrusion of the polymer, it may also be sealed within the hollow filament by heat-sealing the tube at desired intervals. The hollow-filamentary coordination polymer also may be filled with a liquid such as a medium viscosity mineral oil or silicone oil.

EXAMPLE XXV

The procedure of Example XXIII is repeated using, instead of wire as the reinforcement, a rope of polyacrylonitrile coated with polyethylene and similar results are obtained. Also, instead of polyacrylonitrile, monofilaments, or spun yarn, thread or rope of cotton, linen, jute, hemp, rayon, nylon, polyethylene terephthalate, polypropylene, polyvinylfluoride, polyvinylchloride, and many other natural and synthetic polymers are used as the reinforcement for the grafted coordination polymers of this invention.

EXAMPLE XXVI

A plastisol is prepared from 1000 parts of polyvinyl chloride, 50 parts of commercial divinylbenzene and 800 parts $$CH_2=C(CH_3)COOCH_2CH_2N(CH_2COOH)_2$$

and formed into a 500 denier monofilament, following which is is subjected to 30 megarep of irradiation from a Van der Graff accelerator as in the procedure of Example I to give a crosslinked grafted coordination polymer having coordination activity similar to the polymer of Example I.

EXAMPLE XXVII

A polyethylene terephthalate yarn of 140 denier, 46 filaments is immersed in a 50 percent dioxane solution of $CH_2=CHCOOH_2CH_2N(CH_2COOH)_2$ containing 1% of divinylbenzene for 48 hours. After eliminating the excess liquid by twisting, the yarn is wrapped in aluminum foil and subjected to irradiation of a resonance transformer with an emission current of 560 microamperes at 1 mev. until a dose of 25 mrep is reached, and there is obtained a coordination polymer with the properties similar to that of Example I.

EXAMPLE XXVIII

A spool of polypropylene ribbon 0.250″ wide and 0.010″ thick is treated according to the process of Example I and similar results are obtained.

EXAMPLE XXIX

Thee hundred parts of a 100 filament 250 denier polyethylene terephthalate yarn is varnish coated with a 30% dioxane solution of a copolymer of 200 parts ethylacrylate and 162 parts of $$CH_2=CHCOOCH_2CH_2COOCH_2CH_2N(CH_2COOH)_2$$

and dried and cured at 80° C. for 24 hours and then irradiated to 10 megareps as in Example XXVI, and there is obtained a reinforced coordination polymer which coordinates readily with the ions of Hg, Cd, Zn, Cu, Ni, Co, Fe, Mn, Ag, Pb.

EXAMPLE XXX

Examples I to XXI are repeated but instead of irradiating the polymers in air and then grafting the monomers to the polymers, the polymers are first immersed in a dioxane or acetone solution with or without 1% divinyl benzene of the various chelating monomers for 48 to 192 hours; then after removing the excess liquid by centrifuging, the swollen polymers are subjected to irradiation as in Example XXVII and coordination polymers with properties similar to those found in Examples I to XXI are obtained.

EXAMPLE XXXI

To a mixture of 167 parts of $$HOCH_2CH_2N(CH_2COOH)_2$$

and 59 parts trimethylamine in 500 parts of diethyl ether is added slowly in a reaction flask suitably equipped, 104.5 parts of methacrylyl chloride in 200 parts of ether at 25–30° C. After the addition of the acid chloride there is added 0.25 parts of tertiary butyl catechol and the reaction continued under a nitrogen atmosphere for 4–6 hours. The precipitated trimethylamine hydrochloride is removed by filtration and 300 parts of water added to the reaction mixture, the ether removed by distillation leaving a water solution containing

which can be used as such or purified further to isolate the pure compound. A convenient method of isolating the pure compound is to convert the monomer to a metal chelate. To part of the above solution there is added sufficient NaOH to produce the salt,

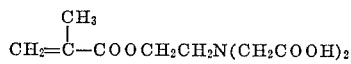

in solution and to this there is added an equivalent amount of $Cu(NO_3)$ to produce

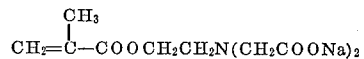

and by concentration of the solution there is isolated the solid crystalline

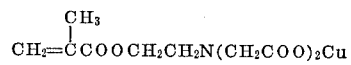

which is recrystallized from water and dried in a vacuum dessicator at room temperature. Elemental analyses on the compound gives values of 39.31% C; 4.28% H; 4.51% N; and 20.69% Cu, which are in excellent agreement with the theoretical values of 39.2% C; 4.24% H; 4.56% N; and 20.61% Cu; a yield of about 96%.

Alternately the monomer may be isolated from the aqueous solution by either extraction in a Sohxlet apparatus to produce an ether solution from which the monomer is isolated by evaporation of the ether to yield

A simple way to isolate the monomer in the free acid form is to treat the copper chelate of this example in water with hydrogen sulfide. Thus

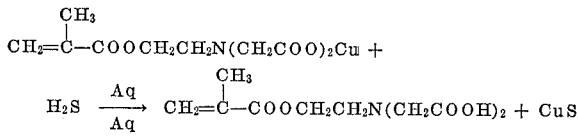

and to remove the CuS by simple filtration leaving and isolating the monomer by concentration and evaporation of the aqueous solution. By either of these methods there is obtained the monomer

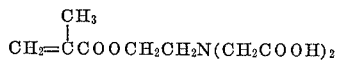

which on elemental analysis gives values of 49.2% C; 6.08% H; and 5.75% N, which are in good agreement with the theoretical values of 49% C; 6.13% H; and 5.7% N.

EXAMPLE XXXII

By using the procedure of Example XXXI, methacrylyl chloride is reacted with the following substituted iminodiacetic acids in the quantities indicated: 138 parts $H_2NN(CH_2COOH)_2$; 166 parts $$H_2NCH_2CH_2N(CH_2COOH)_2$$

236 parts $HN(CH_3)(CH_2)_6N(CH_2COOH)_2$; 222 parts $H_2N(\cdot CH_2)_6N(CHCOOH)_2$ and 195 parts

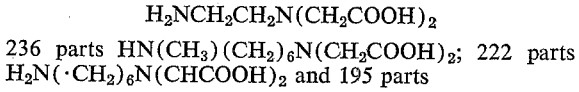

209 parts

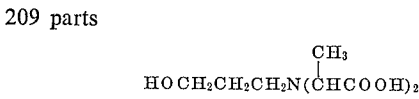

and the corresponding monomers having the acrylyl group,

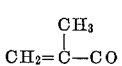

replacing the terminal active amino or alcohol hydrogen are obtained.

EXAMPLE XXXIII

The procedures of Examples XXXI and XXXII are repeated using instead of methacrylyl chloride, the following chlorides in the amounts indicated: 90.5 parts $$CH_2=CHCOCl$$

104.5 parts

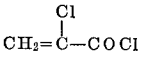

and 129.5 parts

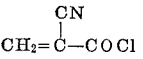

and the acrylo-, α-chloroacrylo-, and α-cyanoacrylo-derivatives of the hydroxyalkyl-, the amino-, and the aminoalkyl-iminodiacetic acids are obtained in good yields.

EXAMPLE XXXIV

This example illustrates the homopolymerization of the monomers of this invention. In a nitrogen atmosphere, thirty (30) parts of

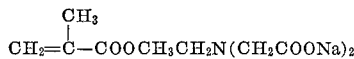

are added to 70 parts of deoxygenated distilled water containing 0.6 part sodium bisulfite. There is then added 0.9 part of ammonium persulfate in 5 parts of water and the mixture stirred at 60° C. for 8 hours producing a viscous clear solution of the polymer. Polymerization is also achieved in this same manner with the salts of the other monomers of Examples XXXI and XXXII.

Instead of the salts, the free acids also may be homopolymerized by this procedure, or in solution in alcohol, or mixtures of alcohols and water, etc.; with other free radical-generating catalysts such as hydrogen peroxide, benzoyl peroxide, etc., alone or in a redox system. Also, these monomers may be homopolymerized or copolymerized by subjecting them alone or in admixture with other monomers or with solvents directly to ionizing radiation.

EXAMPLE XXXV

To 100 parts of distilled water containing one part of dodecyl benzene sulfonate is added 25 parts of styrene and 12 parts of $CH_2=CHCONHN(CH_2COO)_2Cu$ and two parts of 50% $H_2O_2$ and one part of ferrous sulfate. The mixture is reacted at 50°–70° C. for 9 hours and there is obtained a copolymer emulsion which is intensely blue. The emulsion is then spray dried, washed with alcohol, dried, and used as a pigment in acrylic lacquer and other coating compositions with excellent results.

EXAMPLE XXXVI

To a mixture of 90 parts of ethyl methacrylate, 5 parts of styrene and 5 parts of

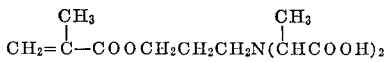

and 400 parts of ethyl acetate is added 2 parts of benzoyl peroxide and the mixture refluxed for five hours, then an additional 0.2 part of benzoyl peroxide is added, the mixture refluxed for 3 more hours and there is obtained a copolymer solution useful as a lacquer coating especially for metals. Sheets of aluminum, copper, and iron are coated with this solution, allowed to air dry, and then heated at 60°–100° C. for 2 hours to eliminate residual solvent. The adhesion of the film to the metal is much greater than when the chelating monomer is omitted from the formulation. The copolymer of this example may be used as the protective coat or it may be used as an undercoat for other coatings such as varnishes, paints, and lacquers. Improved adhesion is also found when only 0.1% of the chelating monomers of this invention, such as the monomer of this example or the monomers of Examples XXXI, XXXII, and XXXIII, based on the total weight of monomers in the copolymer are used in the preparation of copolymers.

The chelating polymers of this invention may also be prepared by first polymerizing or copolymerizing the acrylyl type chloride and thereafter reacting the substituted iminodiacetic acid. Alternately, the monomers may be grafted to a preformed polymer which is peroxidized by chemical means rather than by irradiation in the presence of oxygen. These alternate procedures are shown in the following examples.

EXAMPLE XXXVII

Ten parts of styrene, 1.81 parts of commercial divinylbenzene, (containing approximately 50% DVB–50% ethyl styrene), 45 parts of acrylyl chloride, 1 part of α,α-azobisisobutyronitrile are heated at 45° C. for 12 hours, 60° C. for 12 hours, 80° C. for 18 hours, and 100° C. for 24 hours, following which the hard copolymer is ground in a dry atmosphere to small granules and washed with five 100 part portions of dry heptane and then added to 100 parts of dry heptane, to which is added 50 parts of tertiary butyl hydroperoxide and 98 parts of tributyl amine and the mixture stirred for 24 hours at room temperature. The granules are removed by filtration and immersed in 5 portions of 300 parts of ethyl alcohol, filtered and dried at 35–40° C. The peroxidized granules are added to 300 parts of water containing 3 parts of hydroxy apatite, 0.03 part of sodium dodecylbenzene sulfonate, 50 parts of

and 50 parts of benzene, and the mixture stirred for 36 hours at room temperature, followed by heating at 75°–85° C. for 36 hours. The grafted granules were extracted with four 200 ml. portions of methyl alcohol followed by refluxing in 1000 ml. of 5% NaOH for 5 hours and there is obtained a grafted copolymer having pendant

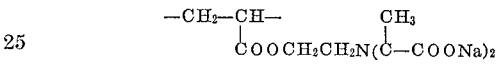

structures attached to the polymer with chelating properties similar to the polymer of Examle I.

EXAMPLE XXXVIII 100 parts of water, 1.10 parts of hydroxy apatite (0.005 to 0.2 micron size) 0.02 part of dodecylbenzene sulfonate, 0.2 part of benzyl peroxide, 1.4 parts of commercial divinylbenzene (approximately 50% DVB-50% ethyl styrene) 50 parts of styrene are mixed at room temperature and stirred to form a suspension system. A steady stream of air is passed into the dispersed system through a 1/32″ capillary for 2 hours, and with the air and stirring continued, the temperature is raised to 60° C. for 16 hours. Then the flow of air is terminated and the mixture heated to 80° C. for 18 hours. There are obtained crosslinked peroxidized beads. The suspension is cooled to 35° C., 25 parts of

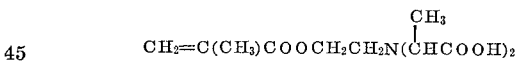

is added to the suspension, and the agitation continued for 2 hours followed by heating at 85° C.–90° C. for 48 hours. The graft ester copolymer is treated with NaOH as in Example XXXI and a chelating copolymer with similar properties to the copolymer of Example XXXVII is obtained.

EXAMPLE XXXIX

Non-crosslinked copolymers and polymers also are made by post reactions. A copolymer of 20 parts of vinyl chloride, 20 parts of vinyl acetate and 100 parts of acrylyl chloride prepared by heating the mixed monomers at 60° C. for 24 hours in the presence of 0.5 part of γ,γ′-azobisisobutyronitrile is reacted with tertiary butyl hydroperoxide as in Example XXXVII, cast into ribbon of 10 mils wide and 1 mil thick and immersed in 20% aqueous solution of $CH_2=CHCOONHCH_2CH_2N(CH_2COOH)_2$ and heated to 65° C. to a 20% weight increase in the polymer, and there is obtained a polymer whose chelating properties closely resemble the properties of the polymer of Example I.

EXAMPLE XL

A 30% solution of acrylyl chloride in tetrahydrofurane with 1% γ,γ′-azobisisobutyronitrile on the weight of the monomer is heated at 75° C. for 48–72 hours, and then diluted to 10% solution with tetrahydrofurane. To this solution is added slowly an equivalent amount of $NH_2CH_2CH_2N(CH_2COOH)_2$ as a 25% solution in tetrahydrofurane in the presence of sufficient solid $NaHCO_3$ to produce the di-salt and the reaction continued at 50°

C. for 12 hours. There is then added sufficient water to dissolve the polymer, producing a clear solution containing the polymer having repeating units of the formula:

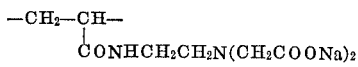

which has marked chelating properties.

50 parts of distilled water, 0.5 part of hydroxy apatite (0.005 to 0.2 micron size), 0.1 part sodium dodecylbenzenesulfonate, 2.5 parts of commercial 50% divinylbenzene, 0.1 part benzoyl peroxide, and 35 parts of isopropyl styrene are mixed in a suitable reaction flask and stirred for 16 hours at 90° C., following which the mixture is cooled to 25° C. and 10 parts of cumene hydroperoxide added and the suspension heated to 35°–45° C. for 5 hours. The beads are removed by filtration, washed with 3 100 part portions of methyl alcohol and 3 200 part portions of hexane and the beads reintroduced into the aqueous suspension system to which is added 50 parts of

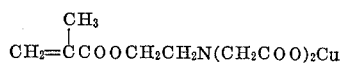

followed by stirring at room temperature for 24 hours, then at 80° C. for 72 hours to produce an infusible chelating polymer.

EXAMPLE XLI

The procedure of Example I is repeated a number of times using in place of the grafting monomer therein, the respective monomers prepared in accordance with Examples XXXII and XXXIII. The resulting grafted copolymers have very good chelating properties when tested as in Examples I–IV.

The polymers produced according to the processes described in the application and illustrated in the various working examples above have a plurality of repeating units which contribute chelating properties to the respective polymers. These repeating units can be linked directly in the linear chain of a polymer when the chelating monomer is homopolymerized or copolymerized with various monomers as discussed herein. In such case the repeating units can be interspersed with repeating units of the comonomers. These repeating units of the chelating monomers can be represented as present in the polymer molecule in the form of

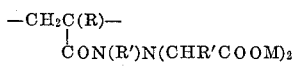

or

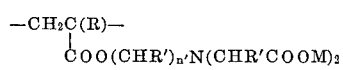

or

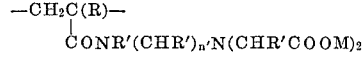

wherein R, R', M and $n'$ are as previously defined. The radical $(CHR')_{n'}$ is preferably $(CH_2)_{n'}$ and advantageously has a total of no more than four R' groups representing lower alkyl groups in such radical.

When the chelating monomers are grafted onto a preformed polymer as described herein, the resultant copolymer has pendant radicals of one or more of the formulas:

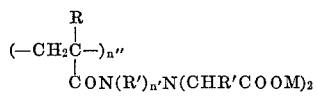

or

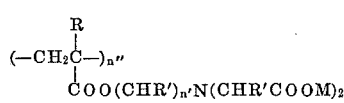

or

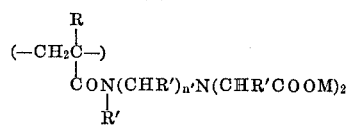

wherein $n'$ is an integer having a value of at least one, $n''$ is an integer having a value of at least 2, and the various other symbols have the definitions given above. Wherever $n$ has been used in formulas hereinabove, it represents an integer having a value of at least 2. The end valence of the last repeating unit in a series can be attached to another polymer molecule or to a hydrogen atom or other chain terminating group.

The following typical repeating units illustrate those derived in the various polymers described in the working examples, as follows, including those in which metals have been added:

Examples I–IV:

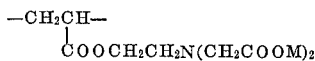

Example V:

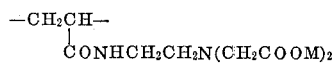

Examples VI–VII:

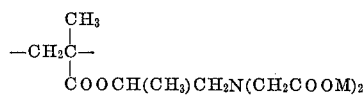

The repeating units of Examples I–V are attached to a preformed polyethylene. These same repeating units are also attached in other examples to various other preformed polymers: for example, on polypropylene in Example VIII; on an ethylene-propylene copolymer in Example IX; on polybutene-1 in Example X; on polyacrylonitrile in Example XI; on polyvinylchloride in Example XII; on polytetramethylene-terephthalate in Example XIII; on 6-6 nylon in Example XIV; on polycaprolactam in Example XV; on polytrifluorovinyl chloride-perfluoropropylene copolymer in Example LX; and on polydimethyl silicone in Example XVII.

Example XVIII shows the preparation of a copolymer having the repeating unit

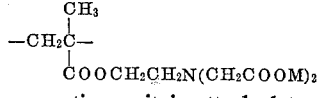

This same repeating unit is attached to various other polymeric materials as disclosed in Example XXV, for example, polyacrylonitrile, cotton, linen, jute, hemp, rayon, nylon, polyethylene perphthalate, polypropylene, polyvinyl fluoride, polyvinyl chloride, etc.

The homopolymer of Example XXXIV has a plurality of repeating units of the formula:

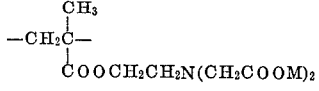

The styrene copolymer of Example XXXV has a plurality of repeating units of the formula:

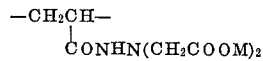

The terpolymer of Example XXXVI has repeating units of ethylmethacrylate, styrene and

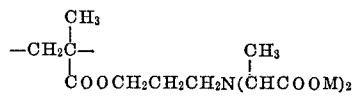

The chelating effect of these repeating units is noted when as little as 0.1% by weight is present, preferably, however, at least 1% by weight is present.

In the above repeating units a preferred form is that in which M represents hydrogen.

The invention claimed is:

1. A reinforced filament of chelating resin comprising a metal wire having a continuous coating thereon of a grafted polymeric composition comprising in the polymer structure thereof at least 0.1 percent by weight of a repeating unit having a formula selected from the class consisting of:

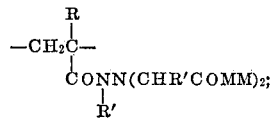

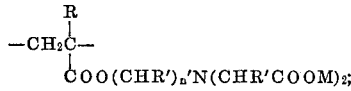

and

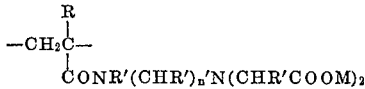

wherein:

R is a radical selected from the class consisting of hydrogen, methyl, chlorine and cyano;

R' represents a radical selected from the class consisting of hydrogen and alkyl and aralkyl groups having no more than 10 carbon atoms therein;

n' is an integer having a value of at least 2 and no more than 10; and

M is a member of the class consisting of hydrogen and alkyl and aryl radicals each having no more than 10 carbon atoms, the ammonium radical and derivatives thereof in which each of the derivative groups is selected from the class consisting of alkyl and aryl groups having no more than 10 carbon atoms, and metal atoms.

2. A reinforced filament of claim 1 in which said repeating unit has the formula

3. A reinforced filament of claim 1 in which said repeating unit has the formula

4. A reinforced filament of claim 1 in which said repeating unit has the formula

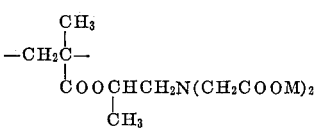

5. A reinforced filament of claim 1 in which said repeating unit has the formula

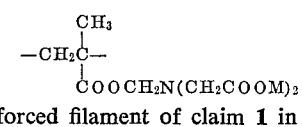

6. A reinforced filament of claim 1 in which said repeating unit has the formula

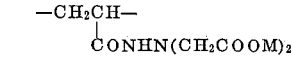

7. A reinforced filament of claim 1 in which said polymeric composition is primarily polyethylene.

8. A reinforced filament of claim 1 in which said polymeric composition is primarily polypropylene.

References Cited

UNITED STATES PATENTS 2,776,918    1/1957    Bersworth _____ 117—127

ALFRED L. LEAVITT, Primary Examiner

J. A. BELL, Assistant Examiner

U.S. Cl. X.R.

117—93.3, 232; 260—2.2, 80, 80.3, 86.1, 89.5, 486